United States Patent [19]

Smith

[11] 4,209,732

[45] Jun. 24, 1980

[54] REGULATED DEFLECTION CIRCUIT

[75] Inventor: Lawrence E. Smith, Indianapolis, Ind.

[73] Assignee: RCA Corporation, New York, N.Y.

[21] Appl. No.: 964,973

[22] Filed: Nov. 30, 1978

[51] Int. Cl.² .................. H01J 29/70; H01J 29/76
[52] U.S. Cl. ............................ 315/400; 358/190; 315/411
[58] Field of Search ............... 315/400, 411; 358/190, 358/243

[56] References Cited

U.S. PATENT DOCUMENTS 3,803,447   4/1974   Wölber .................................. 315/400

*Primary Examiner*—Theodore M. Blum

*Attorney, Agent, or Firm*—Eugene M. Whitacre; Paul J. Rasmussen; Joseph J. Laks

[57] ABSTRACT

To regulate the DC input voltage to a deflection circuit, a saturable reactor winding is series coupled with an unregulated DC voltage, a diode, a flyback transformer winding and an input terminal of the deflection circuit. During retrace, the diode is forward biased and conducts input current to the input terminal. During trace, the opposite polarity trace voltage commutates off the diode and decouples the input terminal from the unregulated DC voltage at a varied instant within trace in accordance with the impedance of the saturable reactor winding. The average DC voltage across the diode fluctuates with diode conduction angle variations and maintains a regulated input voltage at the input terminal despite fluctuations in the unregulated DC voltage.

5 Claims, 2 Drawing Figures

REGULATED DEFLECTION CIRCUIT

BACKGROUND OF THE INVENTION

This invention relates to regulated deflection circuits.

A typical circuit in switching regulators for television receiver deflection circuits includes an SCR regulator switch in series with the unregulated DC voltage and the regulated B+ input voltage. Also series coupled is a flyback transformer winding and a current limiting fixed value inductor.

During a variable turn-on instant within trace, for example, the SCR is forward biased into conducting input current. The input current reaches a maximum at the end of trace and decreases to zero during retrace as the retrace pulse voltage causes the input current to decrease and commutate off the SCR. The SCR remains nonconductive until the aforementioned turn-on instant occurs in the next deflection cycle. Regulation is achieved using SCR gate pulse control circuitry which varies the turn-on instant of the SCR. Such switching regulators are relatively costly in that an active semiconductor device and a relatively complicated control circuitry are required.

Some regulators for thyristor deflection circuits include both a forward input current and a return current path from the unregulated DC terminal to the thyristor deflection circuit. A transductor is then placed in one of the current paths for regulating one of the forward input and return currents. Such circuits are relatively dissipative as both forward and return currents flow each deflection cycle.

SUMMARY OF THE INVENTION

A source of unregulated voltage, a deflection transformer winding, a rectifier and a saturable reactor winding, are coupled to an input terminal of a deflection circuit. A first polarity voltage in the transformer winding biases the rectifier into conduction. A second polarity voltage commutates off the rectifier, thereby developing a DC voltage across the rectifier. This DC voltage is varied in accordance with changes in the saturable reactor winding impedance which varies the commutation instant of the rectifier, thereby regulating the voltage at the input terminal.

DESCRIPTION OF THE INVENTION

Figure 1:
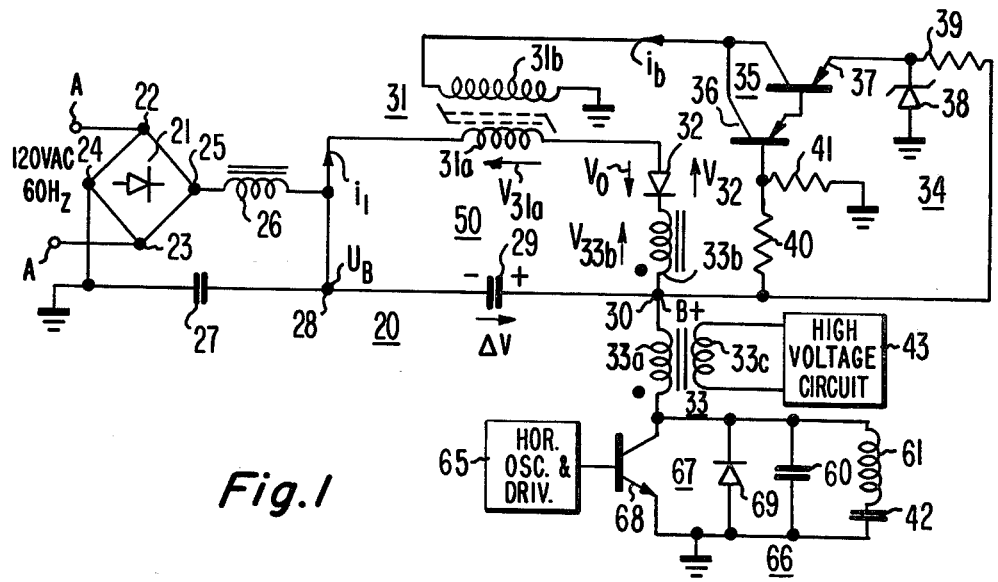
FIG. 1 illustrates a regulated deflection circuit embodying the invention.

In the regulated deflection circuit 20, illustrated in FIG. 1, AC line mains supply of illustratively 120 VAC, 60 Hz, developed at terminals A—A, is coupled to input terminals 22 and 23 of a full-wave bridge rectifier 21. Coupled across output terminals 24 and 25 is a choke input filter comprising an inductor 26 and a capacitor 27. A filtered, but unregulated DC voltage $U_B$ is developed at a terminal 28, the junction of inductor 26 and capacitor 27.

A voltage regulator circuit 50 embodying the invention is coupled between terminal 28 and an input terminal 30 of horizontal deflection circuit 20 for developing a regulated B+ input voltage at input terminal 30. Input terminal 30 is coupled through a primary winding 33a of a horizontal output or a flyback transformer 33 to a horizontal output stage 66 of horizontal deflection circuit 20.

Horizontal output stage 66 comprise a series coupled horizontal deflection winding 61 and trace capacitor 42, a retrace capacitor 60, and a trace switch 67 comprising a horizontal output transistor 68 and a damper diode 69 for generating scanning current in deflection winding 61 each horizontal deflection cycle. A conventional synchronized horizontal oscillator and driver circuit 65 provides switching control signals to the control base electrode of horizontal output transistor 68 to turn on the transistor during the horizontal trace interval and to turn off the transistor for initiating the horizontal retrace interval. A high voltage winding 33c of flyback transformer 33 is coupled to a conventional high voltage circuit 43 for developing an ultor accelerating potential for beam current.

Voltage regulator 50 includes a first saturable reactor winding 31a of a saturable reactor 31, a rectifier diode 32, and a flyback transformer secondary winding 33b series coupled between terminal 28, at which the unregulated DC voltage $U_B$ is developed, and input terminal 30, at which the regulated B+ voltage is developed. The difference $\Delta V$ in the DC voltages between terminals 28 and 30 is developed across filter capacitor 29. The physical construction of saturable reactor 31 is of conventional design such as an RCA Corporation saturable reactor T103, CTC-87 chassis, Stock No. 143562.

As illustrated in FIG. 1, diode 32 is poled to conduct input current $i_1$ from terminal 28 to input terminal 30 of horizontal deflection circuit 20. Diode 32 is commutated off each deflection cycle by the alternating current deflection rate voltage $V_{33b}$ developed in flyback transformer secondary winding 33b, as will be further explained. The average or DC value for input current $i_1$ will be a function in part of the diode conduction time or angle and the amount of impedance to the flow of input current $i_1$ presented by reactor winding 31a. Similarly, the conduction angle modulation of diode 32 will also be a function of the changes in impedance of reactor winding 31a.

The effective impedance of reactor winding 31a is changed by varying a bias current $i_b$ in a bias winding 31b of saturable reactor 31 that is magnetically coupled to reactor winding 31a. The bias current $i_b$ developes a bias magnetic flux in the core of saturable reactor 31 which controls the impedance of reactor winding 31a.

The varying bias current $i_b$ is developed by a bias control circuit 34 which is responsive to a regulated quantity of horizontal deflection circuit 20. As illustrated in FIG. 1, the regulated quantity may be the B+ input voltage at input terminal 30. The B+ voltage is sensed by voltage dividing resistors 40 and 41 and coupled to the base of a transistor 36. Transistor 36 and a transistor 37 form a Darlington pair 35, with the collectors of transistors 36 and 37 coupled to bias winding 31b. The emitter of transistor 37 is referenced to the zener voltage of a zener diode 38. Zener diode 38 current is obtained from terminal 30 through a resistor 39.

In operation, fluctuations, in the B+ input voltage at input terminal 30 due to fluctuations in the unregulated DV voltage $U_B$, for example, is sensed by bias control circuit 34, which then varies the bias current $i_b$ in such a manner as to maintain the B+ input voltage constant, as will now be explained with the aid of the waveforms of FIGS. 2a–2d.

Figure 2:
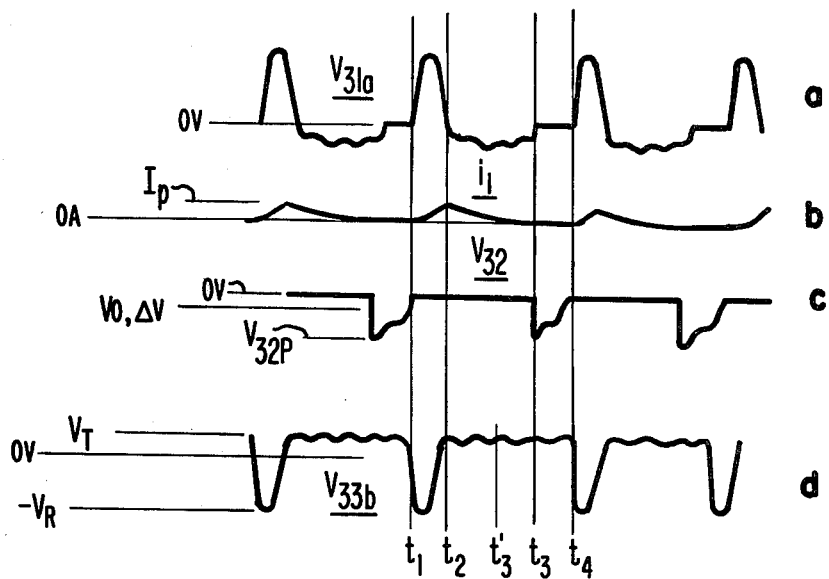
FIG. 2 illustrates waveforms associated with the circuit of FIG. 1.

With flyback transformer windings 33a and 33b poled as illustrated in FIG. 1, a negative retrace pulse voltage $V_{33b}$ of amplitude $V_R$, as illustrated in FIG. 2d, at time $t_1$, is developed in flyback secondary winding 33b and is coupled to the cathode of diode 32. Diode 32 is forward biased into conduction, as illustrated in FIG. 2c by the diode voltage $V_{32}$ being approximately zero. As illustrated in FIG. 2b, an input current $i_1$ flows from terminal 28 through reactor winding 31a, diode 32, and flyback secondary winding 33b to B+ input terminal 30.

As illustrated in FIG. 2a by the voltage $V_{31a}$ across reactor winding 31a, with diode 32 conducting, the retrace pulse is coupled to reactor winding 31a, and a voltage is developed across reactor winding 31a equal approximately to the retrace voltage $V_R$, less the difference $\Delta V$ in DC voltages at terminals 30 and 28. Input current $i_1$ increases throughout the retrace interval $t_1$–$t_2$, as illustrated in FIG. 2b. This increase will be limited by the effective impedance exhibited by reactor winding 31a, as established by the bias current $i_b$ flowing in bias winding 31b.

During a first part of the next trace interval, $t_2$–$t_4$, the voltage polarity across flyback secondary winding 33b reverses and an opposite polarity trace voltage is coupled to reactor winding 31a, and an opposite polarity voltage is developed across reactor winding 31a. This opposite polarity voltage equals approximately the difference $\Delta V$ in DC voltages at terminals 30 and 28 less the trace voltage $V_T$, as illustrated in FIG. 2a, between times $t_2$–$t_3$.

With an opposite polarity voltage across reactor winding 31a, input current $i_1$ decreases, and at time $t_3$, diode 32 is commutated off as current attempts to reverse in the diode. Thus the alternating current deflection rate voltage in flyback transformer secondary winding commutates off diode 32 at a controlled instant $t_3$ within the trace interval. The exact instant $t_3$ is a function of the effective impedance of reactor winding 31a as established by bias current $i_b$ flowing in bias winding 31b, and is also a function of the difference voltage $\Delta V$.

During the remainder of the trace interval, $t_3$–$t_4$, diode 32 is reverse biased. Diode 32 therefore decouples input terminal 30 from the source of unregulated DC voltage $U_B$ at terminal 28 during the latter portion, $t_3$–$t_4$, of trace. Because diode 32 does not conduct for the entire deflection cycle an average DC voltage $V_0$ can be developed across the diode.

As illustrated in FIG. 2c, during the nonconduction interval, $t_3$–$t_4$, of diode 32, the reverse biasing voltage $V_{32}$ across the diode equals approximately the difference $\Delta V$ in DC voltages at terminals 28 and 30 less the trace voltage $V_T$. When averaged over the entire deflection interval, the average DC voltage $V_0$ must equal the difference voltage $\Delta V$. This results from the fact that no average DC voltage can be induced or applied across magnetic windings 31a and 33b. Thus the average DC voltage $V_0$ across diode 32 must equal the DC difference voltage $\Delta V$ across terminals 30 and 28. Capacitor 29 thus functions merely as a filter to produce a relatively constant voltage at terminal 30. Capacitor 29 may alternatively be coupled between terminal 30 and ground rather than between terminal 30 terminal 28.

As mentioned previously, diode 32 conducts during the entirety of retrace and is commutated off during the latter portions of trace. Thus, the average DC voltage $V_0$, or the difference voltage $\Delta V$, is a function of the conduction time of diode 32. Should the unregulated voltage $U_B$ decrease, the difference voltage $\Delta V$ must increase in order to maintain a constant regulated B+ input voltage at input terminal 30. An increase in $\Delta V$ is accomplished by commutating off diode 32 at an earlier instant $t_3'$ within trace, thereby applying a reverse biasing voltage across diode 32 for a longer interval. An increase in peak value $I_p$ of input current $i_1$ is required to maintain a constant average load. This increase in $I_p$ occurs because a decrease in voltage $U_B$ causes the Darlington pair 35 of bias control cicuit 34 to conduct more bias current $i_b$, decreasing the effective impedance of winding 31a, thereby producing the required increase in $I_p$.

Earlier commutation of diode 32 will also occur with a decrease of $U_B$ because of the increase in voltage difference $\Delta V$ applied across reactor winding 31a during the first portion of trace, $t_2$–$t_3$, causing a faster decrease in input current $i_1$. Thus, varying the conduction angle of diode 32 in response to fluctuations in the unregulated voltage will maintain the regulated B+ input voltage constant, with the DC fluctuations appearing across the diode.

It should be noted that regulator circuit 50 may also be operated with the winding polarity of flyback secondary winding 33b the reverse of that illustrated in FIG. 1. Then, diode 32 conducts during the entirety of trace and is commutated off at a varied instant within retrace.

In either situation, the difference voltage, $\Delta V$, developed across diode 32 as the average DC voltage $V_0$, is of such polarity that the cathode of diode 32, as an average, is more positive than the anode. Thus, the difference voltage $\Delta V$ represents a boost voltage, which when added to the unregulated DC voltage $U_B$ at terminal 28, developes a boosted or higher magnitude B+ input voltage at input terminal 30.

Furthermore, a DC voltage can be developed across terminals 30 and 28 only if diode 32 is commutated off each deflection cycle, thereby decoupling the two terminals for a predetermined interval. If diode 32 conducts for the entirety of each deflection cycle, no difference voltage $\Delta V$ can be developed

What is claimed is:

1. A voltage regulator for a deflection system, comprising:
   a deflection winding;
   a deflection circuit coupled to said deflection winding for generating scanning current in said deflection winding each deflection cycle;
   a transformer coupled to said deflection circuit, including a first transformer winding in which an alternating current deflection rate voltage is developed;
   an input terminal coupled to said deflection circuit for providing an input voltage to said deflection circuit;
   a source of unregulated voltage;
   a rectifier coupled to said input terminal and said source of unregulated voltage and poled to conduct input current from said source to said input terminal;
   a saturable reactor including a first reactor winding series coupled with said source, said first transformer winding, said rectifier, and said input terminal, a first polarity of said deflection rate voltage forward biasing said rectifier into conducting input current to said input terminal, a second polarity of said deflection rate voltage decreasing said input current sufficiently to commutate off said rectifier and decouple said input terminal from said source of unregulated voltage, for developing an average DC voltage across said rectifier; and biasing means coupled to said first reactor winding and responsive to said unregulated voltage for changing the effective impedance of said first reactor winding for varying the instant at which said rectifier is commutated off for varying said average DC voltage across said rectifier for maintaining a regulated input voltage.

2. A voltage regulator according to claim 1, wherein said biasing means comprises a bias winding magnetically coupled to said first reactor winding for providing a bias flux to said first reactor winding.

3. A voltage regulator according to claim 2 including bias circuitry responsive to said input voltage for developing a bias current in said bias winding.

4. A voltage regulator according to claim 3 wherein a retrace voltage in said first transformer winding forward biases said rectifier during a retrace interval of said deflection cycle and a trace voltage in said first winding commutates off said rectifier at a varied instant within a trace interval of said deflection cycle.

5. A voltage regulator according to claim 4 wherein said average DC voltage adds to said unregulatd voltage in such as manner as to provide a boosted input voltage.

* * * * *